(12) United States Patent
Rivaillier (10) Patent No.: US 7,878,413 B2
(45) Date of Patent: Feb. 1, 2011

(54) METHOD FOR THE DUAL CODING OF INFORMATION ON PHYSICAL MEDIA AND IN A COMPUTERIZED FORMAT (DOTEM)

(75) Inventor: Jacques Rivaillier, Magny-les-Hameaux (FR)

(73) Assignee: Alphacode, Magny-les-Hameaux (FR)

( * ) Notice: Subject to any disclaimer, the term of this patent is extended or adjusted under 35 U.S.C. 154(b) by 657 days.

(21) Appl. No.: 11/890,294

(22) Filed: Aug. 3, 2007

(65) Prior Publication Data

US 2008/0179406 A1 Jul. 31, 2008

Related U.S. Application Data

(63) Continuation of application No. PCT/FR2006/000275, filed on Feb. 7, 2006.

(30) Foreign Application Priority Data

Feb. 16, 2005 (FR) .................................. 05 01552

(51) Int. Cl.
G06K 19/06 (2006.01)
(52) U.S. Cl. ....................................................... 235/494
(58) Field of Classification Search .................. 235/494, 235/462.01
See application file for complete search history.

(56) References Cited

U.S. PATENT DOCUMENTS 3,991,300 A 11/1976 Chadima, Jr.

(Continued)

FOREIGN PATENT DOCUMENTS

| FR | 2 804 532 | 8/2001 |
| FR | 2 806 200 | 9/2001 |
| FR | 2 809 210 | 11/2001 |
| FR | 2 815 155 | 4/2002 |
| FR | 2 820 260 | 8/2002 |
| WO | WO 99/26194 | 5/1999 |
| WO | WO 99/26196 | 5/1999 |

(Continued)

*Primary Examiner*—Seung H Lee
(74) *Attorney, Agent, or Firm*—Harness, Dickey & Pierce, P.L.C.

(57) ABSTRACT

DOTEM is an information-coding method which is used to represent same on physical media with the aid of dots and in a computerised format, in memory and on networks with bits. Said method is based on the broad concept of characters grouped into alphabets. The characters comprise dots on documents, for example, and bits in machine format. The physical characters have specific dots that are not represented in machine format in order to enable same to be located on media, such as the foot of a character and the head of a character. Each character can represent at least the 256 values of an octet. The character concept is extended such that it can be identified by the value thereof and, such that it can be identified by the value thereof and, taken together, can represent one or more variables having any dimension but determined in the structure of the character. The complex data and the context thereof can be described by a series of characters in the form of words or even sentences with a direct language correspondence. As a result, the representation is simpler and more concise. The characters are constructed over several columns for documents and over several octets for machine format. Said characters can code values far greater than the octet, such that tags or field delimiters can be designated directly without the need for prior formatting. Specific alphabets can be developed for each application domain, such as for sound recordings, chemical compounds and text and file security. Non-standard characters have been developed for discrete applications, such as to combat the fraudulent erasure of data.

11 Claims, 3 Drawing Sheets

U.S. PATENT DOCUMENTS

| | | |
|---|---|---|
| 4,545,066 A | 10/1985 | Gascuel et al. |
| 4,998,010 A | 3/1991 | Chandler et al. |
| 5,126,542 A | 6/1992 | Priddy et al. |
| 6,273,340 B1 | 8/2001 | Rivailler |
| 6,830,198 B2 | 12/2004 | Walmsley et al. |
| 7,097,099 B2 | 8/2006 | Hepworth et al. |
| 7,581,683 B2 | 9/2009 | Walmsley et al. |

FOREIGN PATENT DOCUMENTS

| | | |
|---|---|---|
| WO | WO 02/052486 | 7/2002 |
| WO | WO 03/023703 | 3/2003 |
| WO | WO 03/025847 | 3/2003 |
| WO | WO 03025847 A1 * | 3/2003 |
| WO | WO 03/043000 | 5/2003 |

* cited by examiner

METHOD FOR THE DUAL CODING OF INFORMATION ON PHYSICAL MEDIA AND IN A COMPUTERIZED FORMAT (DOTEM)

CROSS-REFERENCE TO RELATED APPLICATIONS

This application is a continuation of Application No. PCT/FR2006/000275, filed Feb. 7, 2006, which claims priority to French Application No. 05/01552, filed Feb. 16, 2005. Both of these applications are incorporated by reference herein.

BACKGROUND AND SUMMARY

I—Introduction

Many methods of representing information in digital form are known, in particular character codes such as bar codes and message codes such as 2D codes. Only the latter make it possible to code a byte (256 values) and to represent a computer file. The Dote character code is also known, each character of which can code 1024 values, that is to say the equivalent of 4 bytes.

The DOTEM method that we are presenting is an improvement to the DOTE® method, French patent No 00 06411 and the PCT patent No 0102889 of the same inventor, which he is supplementing and developing.

II—Presentation

In data processing, all the information is finally coded in the form of bytes, which each have a value of between 0 and 255. The DOTEM method makes a particular structure or character correspond to each of these values. All these characters are grouped together in the form of alphabets each comprising several character fonts. The originality of the invention lies in the construction of the structure of these representations and the properties that stem from this.

The DOTEM representation is of the 2D type (the information is coded in 2 dimensions, x and y), unlike the representation of 1-dimensional character codes such as bar codes. Each byte is represented, in the DOTEM method, by a specific structure that is independent of the size and content of the file, unlike the great majority of bi-dimensional codes (2D), which each represent all the information by specific global graphical structure where there are no characters. These are 'global' codes, unlike the present concept, which is 'alphabetic', and therefore open.

The aim of the DOTEM method is:

to represent the computer files, partially or totally, conjointly on any physical medium, and in computerised form, in memory and on a network;

to simplify the formatting conventions and codings by characters with a value greater than one byte and/or representing complex variables;

to increase the security of processing (auto-checking at character level).

DETAILED DESCRIPTION

Definitions

DOTEM alphabet: set grouping together the character fonts with the same dimension, that is to say the same number of columns. Each alphabet comprises various physical character fonts. They have a particular geometric structure relating to the constitution of the header and possibly the foot of the character.

Dot: elementary information surface, generally binary, on any physical medium.

Mix Dot: dot consisting of a half dot, generally black, and a half dot without printing (white background). Generally the mixed dots of the header are black/white and those of the foot are white/black.

Bit: computer binary information element corresponding to the physical dot;

Columns: series of dots on a physical medium, for example paper;

Byte: series of 8 bits or computer character;

Definition of characters: this specifies the number of columns or bytes making up the character. The DOTEM characters are composed of at least two columns or bytes. The number of columns or bytes is not limitative. The characters are grouped together in alphabets, generally according to their number of columns (or bytes).

Physical characters: structure composed of columns of dots of 2 types:

the detection/marking dots essential to the location of the characters on the physical medium. Their variants give rise to different fonts. They do not have an equivalent in data processing;

the value dots that serve to code the 'weight' of the character (0 to 1023 for the 2-column alphabet). They code the general information. Each value dot corresponds to 1 data processing bit.

Data processing characters: structure usually of 8 bits or one byte, always binary;

Column head: black dot or mixed dot, the latter is composed of a black half dot and a white half dot;

Column foot: last dot, generally mixed, of the column. It usually determines the first column of a physical character;

Character header: set of black dots, generally alternating with mixed dots, capping the body of the physical characters;

Character foot: at the bottom part of the physical characters outside the dots coding the information and which alone correspond to bits of the data processing characters. The existence of a character foot is optional and depends on the font.

Column body: part of the column outside the character header and possibly foot, the dots of which correspond directly to the bits of the byte with the same structure;

Richness or power of representation of a character: this is the possibility of the character being able to represent a number of different values. A byte can take 256 different values. A DOTEM character with 2 columns can represent 1024 of them, with 3 columns 16384, etc.

Delimiter or tag or index: these are the characters whose value exceeds 255 (max. value of the byte), used in particular to delimit and describe the fields.

The DOTEM method is based on the original association and implementation of the following concepts:

1—Concept of Alphabet

Definition of the alphabet in general: system of signs (letters) serving to transcribe a language. Here language may correspond to a field of application. Unlike bar codes or 2D codes, this concept of alphabet confers on the DOTEM method a very great flexibility to the specificities of the various applications. The characters or structures grouped together in alphabets can quantify one or more specific variables peculiar to the field, thus defining any complex variables (by analogy with complex numbers). A series of such characters makes it possible to describe sets of multiple data and their context, like the words and sentences of a language.

Moreover, management of security by means of redundancy is free and accepts any concept in order to adapt more effectively to the constraints of the sometimes contradictory applications. The user keeps complete freedom in its implementation. The representation can be linear or not, without limitation on size. On a document, the writing can be carried out on an edge horizontally or vertically, as well as over the entire length of a continuous object (paper or piece of cloth, etc).

2—Generalisation of the Concept of Character

Each DOTEM character has its dual or 'double' in data processing. A character on a physical medium referred to as a 'physical character' has its dual in memory or on a network referred to as a 'computer character'.

Example 1 character formed from dots on paper corresponds to 1 byte formed from bits in machine format. For the value dots which alone support the useful information:

1 black dot=1 '1' bit and 1 white dot=1 '0' bit.

This one-to-one mapping simplifies the interface software. In addition the size of the characters and their spacing on a physical medium is totally free. Writing can be carried out line by line to any dimension with also any line spacing.

3—Concept of Specific Structure of the Characters

The DOTEM characters have a specific structure that confers on them the following properties:

Possibility of detection whatever their position in a data stream or on a physical medium.

The structure of the columns or byte is interlaced (see the chapter on structure of principal alphabets). This particular structure, linking several columns or bytes, makes it possible to distinguish a DOTEM character in the middle of other information. The greater the definition, the higher the discrimination capability.

Possibility of detecting reading errors and to correct some of these at character level. The purpose of the check columns or bytes is to verify the coherence of the structure of the character. See the chapter on structure of principal alphabets.

Possibility of recognising the orientation of each character in the plane for the physical media. This property is provided by the character header and possibly foot; see the paragraph on structure of principal alphabets.

Complete transparency vis-à-vis computer processing operations such as compression, enciphering or overlaying and self-correction methods such as CRC, Reed Salomon, etc, which are added to those at the level of each character, etc.

Improvement of the efficacy of enciphering since the 256 values of a byte can be converted into 1024 (or more) independent values.

NB:

The DOTEM method uses several alphabets according to the definition of the characters. The number of dots per column is variable on principle. It is preferable to limit the number of value dots to 8 in order to simplify the correspondence with the bytes. However, in order to adapt to the constraints of certain applications (for example deformable media), the physical characters may be composed of columns of greater sizes, in particular character head and foot, with or without mixed dot.

4—Concept of Richness or Representation Power of the Characters

The structure of each character makes it possible to automatically detect its definition of 2, 3, 4, . . . columns or bytes. Each column or byte contains a dot or a bit that indicates whether or not the following column or byte belongs to the character (property of linking). The number of values and their size potentially represented by a character depends on its definition (2 columns or more).

Example

One 2 column or 2 byte character can represent 1024 values (10 bits in col. 2+1). one 3 column DOTEM character has 2 different codings:

1. coding of 2 independent values of maximum:

1024 in 10 bits (col. 2+1) and 16 in 4 bits (col. 3);

2. coding of one value in: 2 (col. 1)+8 (col. 2)+4(col. 3) linked=14 bits that is to say→16384 (values per character).

One 4 column DOTEM character has 3 different codings:

1. 3 independent values: 1024 (col. 1+2)+16 (col. 3)+16 (col. 4)

or 2. 2 independent values: 1024 (col. 1+2)+256 (col. 3+4)

3. 1 value for the 4 linked columns: 2 (col. 1)+8 (col. 2)+4 (col. 3)+4 (col. 4)=18 bits that is to say→262144 (values per character).

III—Structures of the Main Character Sets or Alphabets

1—General

If the computer characters are accessible directly through their address, the physical characters must be found in a plane. The latter must have, in addition to the computer characters, a structure making it possible to detect them and to find their orientation in the plane. To do this, they all have a header and sometimes a foot in addition to their body proper. The latter is identical for the 2 types of character, where each physical dot has its match in a computer bit. The physical dots can be of any solid shapes but all similar (circles, squares, rectangles, ellipses, etc) and the columns can be contiguous or not.

1-1—Structures of the Headers of the Physical Characters.

Figure 1:
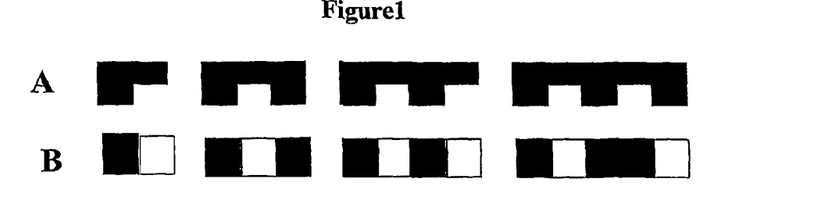
FIGS. 1-7 are diagrammatic views of the DOTEM method of the present invention.

These depend on the definition of the character, that is to say on the number of columns that make it up. It gains from being periodic (e.g. FIG. 1A, plate 1) and consisting of a succession of whole dots (generally black) and mixed dots or an absence of a dot (white background='white dot'), FIG. 1B. It commences with 1 dot (black) followed by a mixed dot or a 'white dot' and then 1 dot (black) and so on in order to make up a crenellated line serving to detect the row of characters and to effect the separation of the columns. It also serves to correct the horizontality or the orientation of the row as well as the orientation of the characters.

Figure 2:
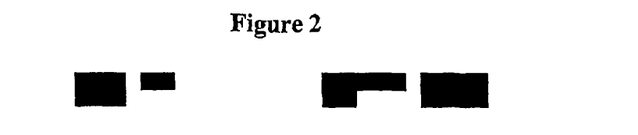

The crenellation can have any horizontal pitch and the dots separated by inter-columns also of any value (FIG. 2). In certain cases (FIG. 6) it is advantageous to replace the black dots of the header with sufficiently dark grey dots in order to be easily detected during a multilevel analysis in order to increase the coding possibilities.

NB:

The mixed dots do not necessarily require a definition twice that required for analysing whole dots. This is because it is not necessary to measure the half dot but only to detect the presence of a smaller dot. This amounts to introducing additional information while being content with a lesser definition. However, some applicative conditions do not permit this use. This is the case in particular with media that may be creased. The mixed dots are then replaced with normal dots or the absence of a dot and the columns are generally extended by one or more dots.

1-2—Structures of Heads and Feet of Columns of Physical Characters.

The column head is the part of the character header that caps the column. The head of the first column (odd No) is a dot (black), that of the second column (even No) is preferably a mixed dot (white/black) and so on for the characters with more than 2 columns. However, the half dots can be replaced by an absence of a dot 'white dot' or a dot (black) according to the design of the font. The last case is used in particular to produce a (black) line all along the row of characters, then detectable as one and the same connected component. The foot of the first column (or last dot) is preferably formed by a mixed dot but may comprise 1 or more (black) dots for the fonts meeting particular conditions of use. The foot makes it possible to characterise the first column (the start of the character) and to determine the base of the physical character.

NB: the Bit $2^7$ is Equal to 1 in the $1^{st}$ Byte of the Computer Character.

1-3—Structures of the Bodies of the Columns of the Physical Characters or Bytes.

The structure of the bodies of the columns (or bytes) is particular for each of the columns as far as the 3-column definition and then gains from being periodic. This character has a so-called value column (byte) that codes the 256 values of the byte and at least one so-called control/extension column (or byte) that makes it possible to interlace the columns (or bytes), to detect reading errors, to correct certain errors and to extend the coding of the values. In the body of the columns (physical character) each dot corresponds to 1 bit (computer character) and vice versa.

2—Two-Column (or Two-Byte) Definition Characters. Plate I.

The columns and bytes being identical dot to bit, only the columns will be described.

2-1—Structure of the First Column.

Figure 3:
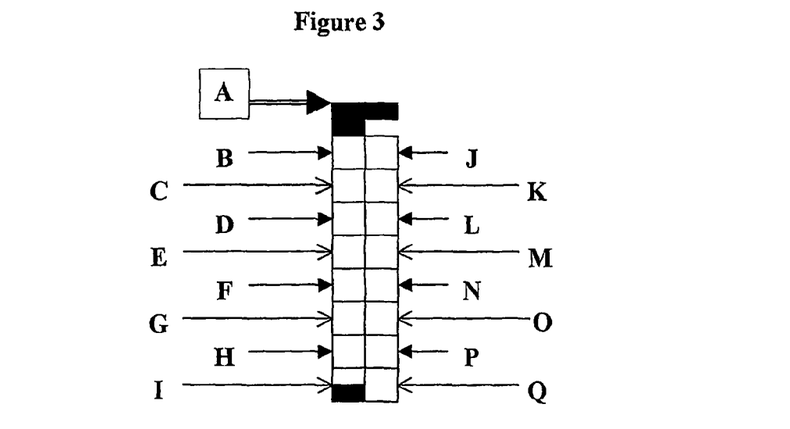

The dots are marked in FIG. 3, plate 1. The column head is designated by the part of A above the column (1 black dot). All of dots B to I and below constitute the body of the column. It consists of 8 dots, preferably contiguous and of the same size. The first dot B of the body serves to detect any error on this column. It represents the odd part of the number of black dots. The total number, excluding foot and head, is therefore always even.

Dots 2, 3, 4 (C, D, E FIG. 3) serve to control the structure of the column 2. Dot C is black (bit 2=1) if the number of black dots in col. 2 is even. Dot D is black (bit 3=1) if the number of black segments in col. 2 is even. Dot E is black (bit 4=1) if the dot J in col. 2 is black (corresponding bit=1). Dots 6 and 7 (G, H) allow an extension to $2^{10}$ of the codification of the values of the character. Dots G=$2^8$ and H=$2^9$ if they are black. Dot 5 (F) gives information on the extension or not of the 3-column definition.

If F is black the character has only 2 columns, if it is white the third column forms part of the same character. When the dots are weighted, the lowest weight commences from the header.

2-2—Structure of the Second Column.

The column head is illustrated by part A FIG. 3 plate 1 above the column. It is preferably one of the types in FIG. 1 plate 1. The following dots constitute the body of the column. They are weighted from $2^0$ (J) to $2^7$ (Q). They serve to code the 256 values of the byte.

3—Three-Column (or Three-Byte) Definition Characters.

Figure 4:
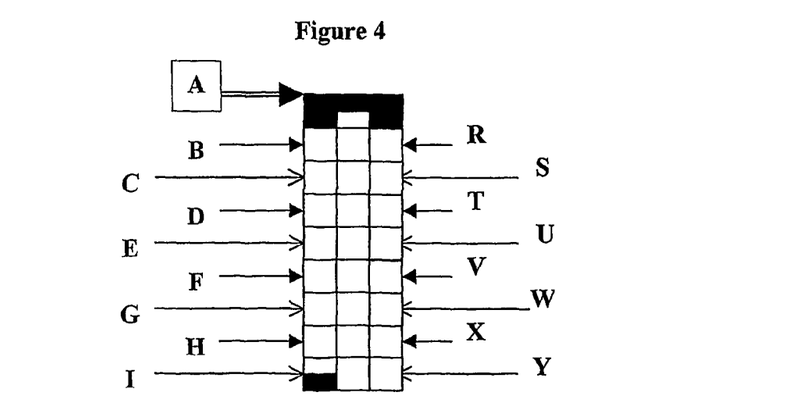

The first two columns have the same structure as that of the 2-column character. The third is shown in FIG. 4. It is as follows: The first dot R serves to detect any error on this column. It represents the odd parity of the number of black dots. The latter is therefore always even. The dot S indicates whether or not the following column belongs to the same character. The dot T is black (bit 3=1) if the number of black segments in column 1 is even.

The dot U is black (bit 4=1) if the dots V, W, X, Y represent the extension of the coding of column 1 (corresponding bit=1). It is white to indicate that the coded value is independent (0 to 15 by means of the 4 dots V, W, X, Y). The dots 5, 6, 7 and 8 (V, W, X, Y) allow an extension of the codification of the values of the character or an independent value. These dots are weighted, the lowest weight commences as from the header, here the dot V.

4—Characters with a Definition Greater than 3 Columns (or >3 Bytes): Plate 2.

Figure 5:
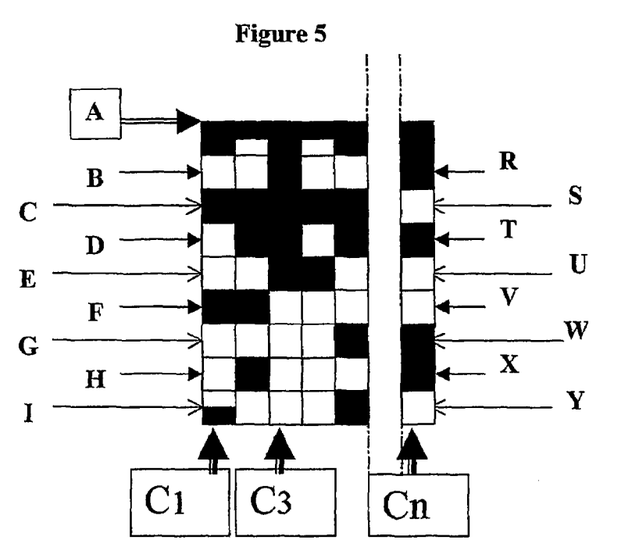

It is recommended to repeat the structure of the 3-column character described previously and to supplement it with columns of the same type as column No 3 in sufficient numbers to represent the information in accordance with the required form. They may be independent or linked in any way. FIG. 5 shows an example of a character with more than 6 columns. The first 4 are linked in order to increase the coded value, the fifth is independent, etc. However, the columns beyond the third may be different, but the extension dot of the definition must remain dot 2 of the body and comply with the convention black (or 1) for the end of the character and white (or 0) to link it to the following column.

IV—Development of the Possibilities of Representing Information by Means of the DOTEM Characters 1—General.

The DOTEM characters allow the encapsulation of information in non-limitative numbers and values. A character consists at a minimum of 2 columns or 2 bytes but this number is not limited. It can then represent information in one or more formats that are complex to a greater or lesser extent. This is because columns 3 and more can be independent and each represent 16 values. They can be linked in any number in order to represent high values or independent in order to represent complex data with several fields.

The DOTEM method allows the representation of complex information in several ways, which may be mixed.

The first consists of using simple characters, for example with 2 columns with values>255 in order to represent 'tags' or 'delimiters' that determine specific data fields, followed by as many characters (or data items) as necessary in the fields.

The second consists of composing an alphabet peculiar to the application field whose characters represent multiple but generic variables that will be associated, such as the letters of a word in order to represent complex information.

If the characters are well produced, the writing will be more obvious, rapid and concise.

2—Links with Other Structures.

In conventional alphabets the concept of kerning links 2 characters and in a similar fashion several DOTEM characters can be linked. This is because, if the start of the following character occurs while the coding of the previous one provides for the continuation of the same character (dot 5), this means that the 2 characters have a common property or that the pair thus formed expresses a particular item of information. The number of consecutive characters thus linked is not limitative.

Example

This method makes it possible to code an isolated field with a length that is variable and in principle unknown. The field is qualified by a tag (or delimiter) and all the constituent characters are thus linked together as far as the last, automatically determining the length of the field.

3—Non-Binary Dots.

The production of structures (or characters) on a physical medium such as a document generally takes place in black and white. The use of colour allows aesthetic effects that can be developed with DOTEM structures, but also the colours also increase the coding capacity of the information. The various colours can be replaced by n shades of grey. Reading does however risk proving to be more tricky. Thus a physical structure dot represents several bits of a computing structure: a physical character of p columns (on paper for example) can represent more than p bytes in memory.

Example

Figure 6:
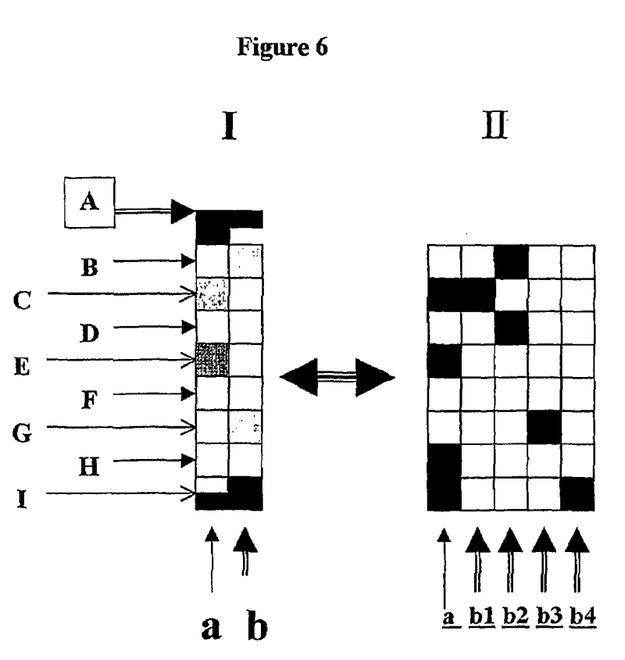

For n=4 (black, red, green, blue) a doubling of the bytes corresponding to one column is obtained (FIG. 6 Plate 2).

Idot→2 bits→Black→00, Red→01, Green→10, Blue→11

The data processing characters are always binary.

4—Representations of Functionalities.

Functionalities can be processed by the association and weighting of variables appropriate to the application within the character.

5—Particular Cases, Example of Anti-Deletion Characters.

To combat fraud that consists of deleting the identification and authentication information, a specific type of character is produced so that the first column ($1^{st}$ byte) is coded differently from the previous characters. In particular dots or bits 2, 3 and 4 are coded the opposite way round. It will not be recognised as a DOTEM character and will trigger an error, but will indicate that it is a case of character of the anti-deletion type. Columns 3 et seq represent the number of protective characters of the text or file allowing the detection of the number of deleted characters.

Another way of dealing with this problem consists of calling a tag for this function for example 1023, the following character or characters indicating the number of linked protected characters; this makes it possible to check the number of characters possibly deleted in the protected zone.

V—Presentation of Applications

1—General.

It is an advantage for certain fields to define a specific alphabet. The DOTEM method makes it possible to construct very rich characters containing much information, for example: The first 2 columns code 1024 values each corresponding to a character number (1024 characters), the following columns can code values of variables particular to the field. The number of variables and their limit value are not limitative. The characters then have the appropriate number of columns. The succession of characters thus formed, to which a name can be given for more convenience, make it possible to represent a large number of complex 'objects' in condensed form and with great flexibility. This concept makes it possible where necessary to construct a particular semantics and rules for use like a language.

2—Application to the Audible Field.

In this field it is advantageous to define at least one set of characters coding several associated variables but of independent value in order to adapt to requirements. It is necessary to proceed with the definition of the structures or characters best meeting the problem. They will for example have to represent: a binary computing and physical identification value, a frequency and a duration of audible execution, possibly a sound level. Other expressed variables may be added, on documents or in computing format, or during audible retrieval etc. The character is more and more composed of columns as it represents more and more information that it encapsulates. It is important to judge whether it is preferable to increase the number of characters within an alphabet or possibly to create another alphabet rather than excessively burdening the definition of the characters. Each case presents an optimum.

Remark 1: In this example, there are several ways of coding the information. The first uses frequencies and durations defined in ranges pre-established to reduce the number of columns of characters. The other directly specifies the data in their unity such as the frequency in Hz and the duration in ms. The characters are more bulky but ranges or tables are unnecessary.

Way 1 consists of:

an identifier to each character (from 0 to 1023) to which a name can be given; this identifier is coded on cols 1 and 2 (10 bits);

a variable representing a corresponding frequency from a range of 16 values coded in col. 3 (independent);

a variable representing a corresponding duration from a range of 16 values coded in col. 4 (independent).

The definition of the character is 4 columns and will be a member of alphabet 1.

Way 2 consists of:

an identifier to each character (1024 possibilities) as before;

a variable representing a frequency expressed in Hz, coded in cols 3, 4 and 5 (linked cols) from 0 to 16384 Hz.

a variable representing a period expressed in milliseconds coded in cols 6 and 7 (linked cols) from 0 to 256 ms.

The definition of the character is 7 columns and will be a member of alphabet 2.

Remark 2: Appreciably audible parts can be coded by DOTEM characters that include within them identification and authentication data so that their deletion, if it allows the loss of identification and authentication, significantly degrades the sound recording or retrieval. The representation of musical scores could also use a particular construction, in particular in machine format.

3—Application to the Chemical Field.

In the same way chemical compounds can be represented in a condensed and practical fashion by means of specific characters, such as for example: The first 2 columns for the designation value (1024), the following 2 or 3 for the 256 simple bodies of base products, the following for the concentration, the following the proportion in the mixture, etc. The formulae developed could also be described in a very condensed fashion.

Remark: It may be useful to define several specific alphabets per field.

4—Security Application: Identification, Authentication (Alphabets for Logos, Seals and Signatures).

The possibility of coding 1024 values by 2-column characters makes it possible to have available in addition 256 values of the byte of 768 which serve principally to designate tags. Some can be used for particular functionalities. This is the case with 'drawing' characters which represent in particular logos (or seals) and signatures within any alphabet. Alphabets of handwriting can thus be created.

Properties:

The first 2 columns correspond to the 2-column characters, but the following ones can be of any type without any construction rules. The last column has advantage in comprising at least one mixed dot in order to detect the end of drawing character. The purpose of these characters is to represent directly a particular drawing formed from dots or bits. These drawings can thus be represented with exactitude on a physical medium or in computing and can be chosen according to the context.

On a physical medium, they can be identified by eye and by optical reading (OCR) as in machine format by software with the representation in bits. These properties are used to guarantee the identification and authentication of texts or files.

Figure 7:
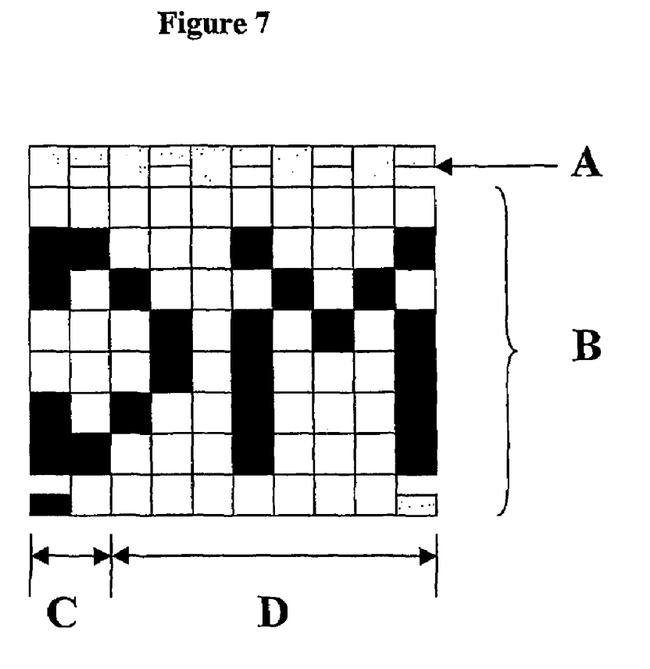

The example in FIG. 7 plate 3 illustrates DOTEM logo 'DM':

Value=833; A=header, B=body, C=2 standard cols, D=free cols.

Remark: Comparison of DOTE and DOTEM Methods.

These are both 2D codes based on the concept of the alphabet. They are composed of columns of binary elements. The Dote method comprises 2 columns, one of which describes parameters making up the second (the value column) and allows the extension of the coded value and optionally a third that represents the complement of the second (direct redundancy).

DOTEM comprises any number of columns also of any size, able to be automatically determined, and an optimised allocation without redundancy of the parameters of the value column. In addition, all the columns in any number are linked successively to one another and carry the information on the number of columns and any link with other characters. The DOTEM characters can code several variables of various dimensions, drawings, signatures, etc, whilst remaining compatible with a direct representation in a computer. Finally, DOTEM introduces a concept of mixed dot. DOTEM corresponds to a multi-criteria optimisation and extension of DOTE, and hence its name.

The invention claimed is:

1. A method of coding information comprising;
creating sets of independent structures of any size, including elements carrying information allowing the identification and descriptive and functional control of structure of the elements;
defining links with other structures;
creating the structures to further include characters representing conjointly the information on a physical medium by dots and in computing format by bits;
creating the structures of the physical characters which comprise on the one hand detection or marking dots that are peculiar to the physical characters and on the other hand dots which each correspond to 1 bit in computing format; and
creating as mixed dot which is half white and half black.

2. The method according to claim 1, wherein the structure of the physical characters has a header capping the bodies, which includes an alternating succession of black dots and additional mixed dots (half black dots and half white dots), or an absence of black dots, in order to form a crenellated line with any pitch and length.

3. The method according to claim 1, wherein the physical structures include one or more so-called control/extension columns and a value column, while the computing structures include as many bytes as there are columns, wherein the physical structures defined by 2 columns at least one is value and at least one is control/extension, these structures comprising:
2 dots reserved for the extension of the coding of the value coded by the value column,
1 dot characterising the parity of the number of its own black dots,
1 dot for the parity of the number of black dots in the value column,
1 dot specifying the parity of the number of segments formed from black dots in the value column,
1 dot giving the state of the first dot in the value column,
1 dot indicating whether the present column is the last of the character or whether the following control/extension column also forms part of it, and
the value column being formed by dots generally weighted to a power of 2 increasing from $2^0$ as from the header.

4. The method according to claim 3, wherein the dots along one and the same column (direction x) of the physical characters are of the same dimension, but possibly variable in the other dimension (y), and in that the distances between the columns may be any distance, including zero.

5. The method according to claim 3, wherein the characters with a definition greater than 2 columns are composed of a non-limitative succession of columns of any length and composition, the last preferably comprising at least the mixed dot (½ white dot+½ black dot).

6. The method according to claim 1, wherein the first column of the structure of physical characters has the mixed dot, which is the last dot, formed from a white half dot and a black half dot.

7. The method according to claim 1, wherein the third column of the characters of 3-column definition comprises:
1 dot characterising the parity of the number of its black dots,
1 dot indicating whether the present column is the last of the character or whether the following control/extension column also forms part of this character,
1 dot expressing the linking of the properties or independence with the following control/extension column,
1 dot specifies the parity of the number of segments of black dots of the previous control/extension column,
4 dots reserved for the extension of the coding of the value coded by the previous columns, and
the first two columns being identical to those of the characters defined on 2 columns.

8. The method according to claim 7, wherein the characters with a definition greater than three columns are composed beyond the third by a succession of columns produced according to the same coding rules as column 3.

9. The method according to claim 1, wherein the dots are N colours or N shades of grey, and the match between physical character and computing character is modified but transposable from the physical characters as follows: a column represents M successive bytes such that for $N=2^P$, $M=P$.

10. The method according to claim 1, wherein the exception characters are produced in accordance with a particular coding so that in particular the coding of the dots or bits are all or some the opposite of that of the standard characters.

11. The method according to claim 1, wherein the header consists of a black dot and the mixed dot so that a succession of characters creates a continuous line converting a row of physical characters into one and the same connected component.

* * * * *